US011355154B2

(12) United States Patent
Tuan et al.

(10) Patent No.: US 11,355,154 B2
(45) Date of Patent: Jun. 7, 2022

(54) INTELLIGENT VIDEO EDITING METHOD AND SYSTEM

(71) Applicant: QNAP SYSTEMS, INC., New Taipei (TW)

(72) Inventors: Chi-Feng Tuan, New Taipei (TW); Yung-Shin Chen, New Taipei (TW); Wan-Ju Tseng, New Taipei (TW)

(73) Assignee: QNAP SYSTEMS, INC., New Taipei (TW)

(*) Notice: Subject to any disclaimer, the term of this patent is extended or adjusted under 35 U.S.C. 154(b) by 0 days.

(21) Appl. No.: 17/148,299

(22) Filed: Jan. 13, 2021

(65) Prior Publication Data

US 2022/0059133 A1 Feb. 24, 2022

(30) Foreign Application Priority Data

Aug. 19, 2020 (TW) ................................ 109128267

(51) Int. Cl.
*G11B 27/031* (2006.01)
*G06N 3/04* (2006.01)

(52) U.S. Cl.
CPC ......... *G11B 27/031* (2013.01); *G06N 3/0454* (2013.01)

(58) Field of Classification Search
CPC ... G11B 27/031; G11B 27/034; G11B 27/105; G11B 27/329; G06N 3/0454; H04N 5/85; H04N 9/8042

USPC ......................................................... 386/241
See application file for complete search history.

(56) References Cited

U.S. PATENT DOCUMENTS

| 2009/0208106 | A1* | 8/2009 | Dunlop | G06K 9/00711 |
| | | | | 382/173 |
| 2010/0093333 | A1* | 4/2010 | Friedenthal | G06Q 30/02 |
| | | | | 455/418 |
| 2019/0035431 | A1* | 1/2019 | Attorre | G11B 27/036 |
| 2019/0228266 | A1* | 7/2019 | Habibian | G06K 9/6262 |

* cited by examiner

*Primary Examiner* — Thai Q Tran
*Assistant Examiner* — Nienru Yang
(74) *Attorney, Agent, or Firm* — Guice Patents PLLC

(57) ABSTRACT

An intelligent video editing method including: receiving and decoding an image data stream from a source storage device to generate an image sequence; performing image extraction operations on the image sequence at intervals of a predetermined time to obtain a plurality of image shots; selecting a frame out of each aforementioned image shot as a candidate frame, and performing a comparison operation on any two consecutive aforementioned candidate frames to derive a group of aforementioned candidate frames belonging to a same scene, and selecting one aforementioned candidate frame from the group as a target frame; and performing an AI evaluation operation on each aforementioned target frame to classify and/or rate each aforementioned target frame.

15 Claims, 5 Drawing Sheets

INTELLIGENT VIDEO EDITING METHOD AND SYSTEM

BACKGROUND OF THE INVENTION

Field of the Invention

The present invention relates to a video editing method, in particular to an intelligent video editing method that can automatically select specific pictures of a video.

Description of the Related Art

General video editing software programs provide a display time adjustment function for displaying image frames, in which a user can press the arrow keys on a keyboard to display the image frames of a video frame by frame to facilitate editing the video.

However, for people who need to edit a large number of videos every day, even though the general video editing software programs have provided the aforementioned display time adjustment function, the workload is still quite heavy.

Therefore, there is an urgent need for a more efficient video editing method in the field.

SUMMARY OF THE INVENTION

One objective of the present invention is to provide an intelligent video editing method, which can reduce the amount of data to be processed by performing image extraction operations on an image sequence at intervals of a predetermined time.

Another objective of the present invention is to provide an intelligent video editing method, which can derive a group of frames belonging to a same scene by performing a comparison operation on any two consecutive captured frames, and select one from the group as a target frame to further reduce the amount of data to be processed.

Another objective of the present invention is to provide an intelligent video editing method, which can use at least one neural network to perform at least one evaluation operation on the target frames to classify and/or rate each of the target frames, can sort the target frames according to ascending or descending order of their respective scores, or select the target frames having scores higher than a threshold, and can further store the target frames either sorted or unsorted.

Another objective of the present invention is to provide an intelligent video editing method, which can use a user interface to enable users to get desired target frames from a memory through selecting a classification or a score threshold.

Another objective of the present invention is to provide an intelligent video editing method, which can use a user interface to enable users to report an erroneous classification or scoring result generated by the neural network to improve the neural network.

Another objective of the present invention is to provide an intelligent video editing method, which can store a user's selection records by using a preference tracking module and/or an aversion tracking module.

Another objective of the present invention is to provide an intelligent video editing method, which can use an advertisement providing module to provide users with at least one advertising message by referencing the selection records stored in the preference tracking module and/or the aversion tracking module.

Still another objective of the present invention is to provide an intelligent video editing method, which can use a filtering module to filter the messages for users by referencing the selection records stored in the aversion tracking module.

To achieve the above objectives, an intelligent video editing method is proposed, which is implemented by an information processing device, and the method includes:

receiving and decoding an image data stream from a source storage device to generate an image sequence consisting of frames;

performing image extraction operations on the image sequence at intervals of a predetermined time to obtain a plurality of image shots, where each of the image shots has n aforementioned frames, and n is an integer greater than or equal to 1;

selecting an i-th one of the n aforementioned frames in each of the image shots as a candidate frame, i being an integer greater than or equal to 1 and less than or equal to n, and performing a comparison operation on any two consecutive aforementioned candidate frames to derive a group of aforementioned candidate frames belonging to a same scene, and selecting one aforementioned candidate frame from the group as a target frame; and using a first neural network to perform a classification evaluation operation on the target frames to attribute each of the target frames to one of a plurality of predetermined classifications; or using a second neural network to perform a score evaluation operation on the target frames to give each of the target frames a score, the score being a real number; or using a first neural network to perform a classification evaluation operation on the target frames to attribute each of the target frames to one of a plurality of predetermined classifications, and using a second neural network to perform a score evaluation operation on the target frames to give each of the target frames a score, the score being a real number; where a plurality of weighting coefficients in the first neural network are obtained by using plural data sets of (input data, output data) to perform a training procedure on the first neural network, the input data being provided by a plurality of the frames prepared in advance, and the output data being provided by a plurality of predetermined classifications, and a plurality of weighting coefficients in the second neural network are obtained by using plural data sets of (input data, output data) to perform a training procedure on the second neural network, the input data being provided by a plurality of the frames prepared in advance, and the output data being provided by a plurality of predetermined real numbers.

In one embodiment, the comparison operation is used to compare a difference value of two moment vectors of any two consecutive aforementioned candidate frames with a threshold, and the two candidate frames will be attributed to an aforementioned same scene when the difference value is less than the threshold, where the difference value can be a root mean square error or a cosine distance, and the moment vector is generated by: dividing an aforementioned candidate frame into n sub-regions in terms of a color space, n being a positive integer; performing m different moment estimation operations on each of the sub-regions to generate m different orders of moment values, m being a positive integer, where the m moment values are m options selected from a group consisting of first-order moment value (average value), second-order moment value (variance value), third-order moment value (skewness value), fourth-order moment value (kurtosis value), . . . and k-th order moment value, k being a positive integer greater than or equal to m;

and using a total of n*m moment values generated from the n sub-regions to form the moment vector.

In one embodiment, the intelligent video editing method further includes: storing at least one generated aforementioned classification and/or at least one generated aforementioned score into a memory unit after using the first neural network and/or the second neural network to perform the classification evaluation operation and/or the score evaluation operation.

In one embodiment, the intelligent video editing method further includes: storing at least one generated aforementioned classification and/or at least one generated aforementioned score higher than a predetermined score into a memory unit after using the first neural network and/or the second neural network to perform the classification evaluation operation and/or the score evaluation operation.

In one embodiment, the intelligent video editing method further includes: performing a sorting process on at least one generated aforementioned classification and/or at least one generated aforementioned score and storing a sorted result thereof into a memory unit after using the first neural network and/or the second neural network to perform the classification evaluation operation and/or the score evaluation operation.

In possible embodiments, the source storage device is a cloud storage device or a local storage device of the information processing device.

In one embodiment, when the intelligent video editing method utilizes the first neural network to perform the classification evaluation operation, the information processing device further provides a user interface for a user to select an aforementioned predetermined classification and/or an aforementioned predetermined score to get at least one desired aforementioned target frame from a memory unit.

In one embodiment, the information processing device further includes a classification error recording module for storing at least one erroneous result of the classification evaluation calculation, which is reported by a user through the user interface, into the memory unit, so as to be used to improve the first neural network.

In one embodiment, the information processing device further includes a preference tracking module for storing records of the user's selections of the predetermined classifications into the memory unit.

In one embodiment, the information processing device further includes an aversion tracking module for storing records of aversion feedbacks of at least one of the predetermined classifications, which are reported by the user through the user interface, into the memory unit.

In one embodiment, the information processing device further includes an advertisement providing module for providing the user with at least one advertising message by referencing the records of the user's selections stored in the preference tracking module and/or the records of aversion feedbacks stored in the aversion tracking module.

In one embodiment, the information processing device further includes a filtering module to filter messages for the user by referencing the records of aversion feedbacks stored in the aversion tracking module.

In one embodiment, when the intelligent video editing method utilizes the second neural network to perform the score evaluation operation, the information processing device further provides a user interface for the user to set the predetermined score and derive at least one aforementioned target frame having the score higher than the predetermined score from the memory unit.

In one embodiment, the information processing device further includes a score error recording module for storing at least one erroneous result of the score evaluation operation, which is reported by the user through the user interface, into the memory unit, so as to be used to improve the second neural network.

To achieve the above objectives, the present invention further provides an intelligent video editing system, which has the aforementioned information processing device to implement the aforementioned intelligent video editing method.

In possible embodiments, the information processing device can be a desktop computer, a portable computer, a smart phone, or a NAS (network attached storage) device.

DETAILED DESCRIPTION OF THE PREFERRED EMBODIMENTS

To make it easier for our examiner to understand the objective of the invention, its structure, innovative features, and performance, we use preferred embodiments together with the accompanying drawings for the detailed description of the invention.

The principle of the present invention lies in:

(1) performing image extraction operations on an image sequence at intervals of a predetermined time to reduce the amount of data to be processed;

(2) deriving a group of frames belonging to a same scene by performing a comparison operation on any two consecutive captured frames, and selecting one from the group as a target frame to further reduce the amount of data to be processed; and (3) using at least one neural network to perform at least one evaluation operation on the target frames to classify and/or rate each of the target frames, and sorting the target frames according to ascending or descending order of their respective scores, or performing a selection process to select one or more of the target frames that have scores higher than a score threshold, and the target frames can be further stored either sorted or unsorted;

(4) using a user interface to enable a user to select a classification or a score threshold to get the desired target frames from a memory unit;

(5) using the user interface to enable a user to report an incorrect classification or scoring result generated by the neural network, so as to improve the neural network;

(6) using a preference tracking module and/or an aversion tracking module to store the user's selection records;

(7) using an advertisement providing module to provide the user with at least one advertisement message by referencing the selection records stored in the preference tracking module and/or the selection record stored; and (8) using a filtering module to filter the messages for the user by referencing the selection records stored in the aversion tracking module.

Figure 1:
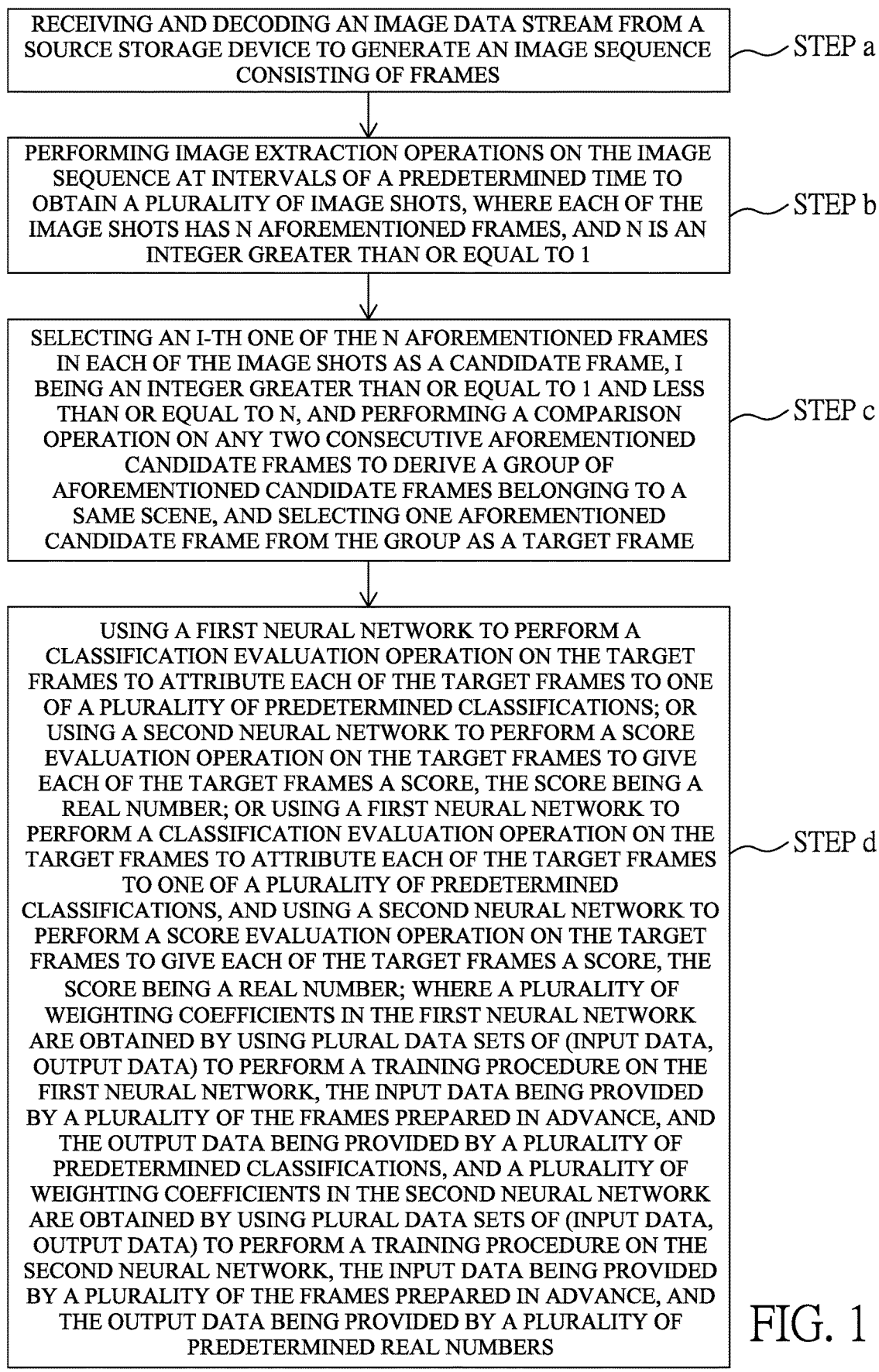
FIG. 1 illustrates a flowchart of an embodiment of the intelligent video editing method of the present invention, the method being implemented by an information processing device.
Figure 2:
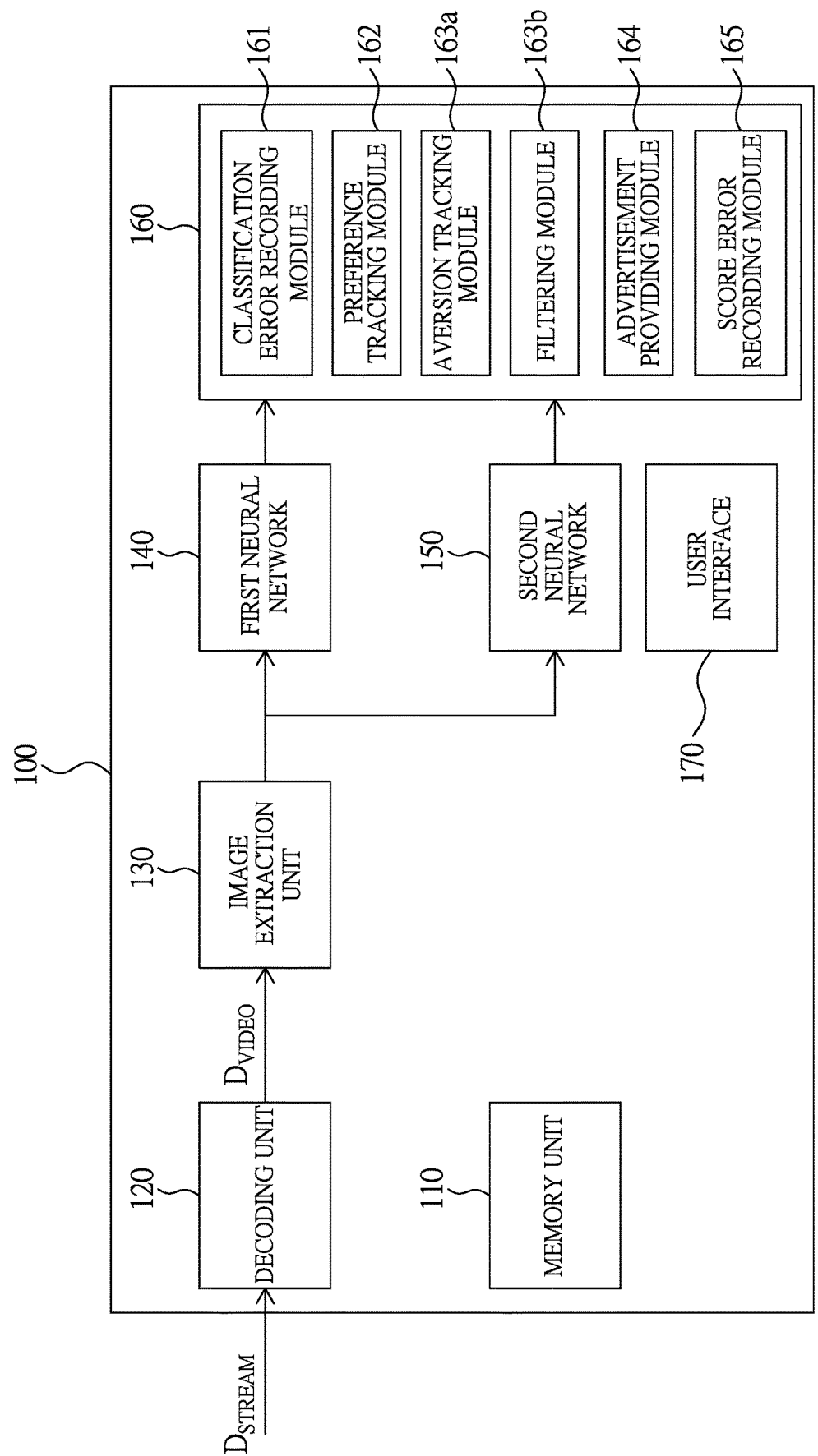
FIG. 2 illustrates a block diagram of a system applying the method of FIG. 1.
Figure 3:
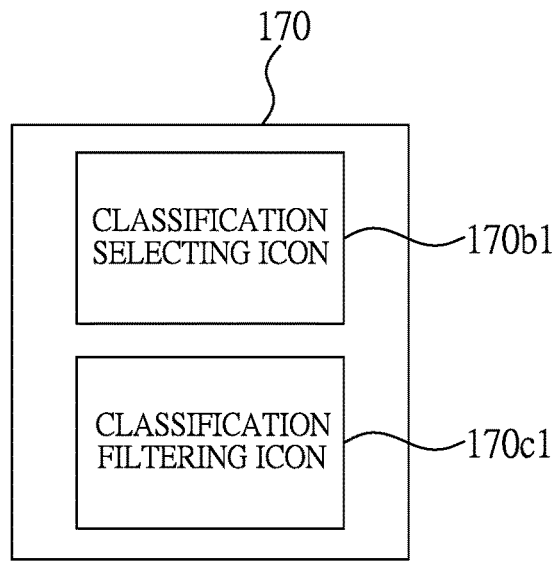
FIG. 3 illustrates an operational interface of the system shown in FIG. 2.
Figures 4A, 4B:
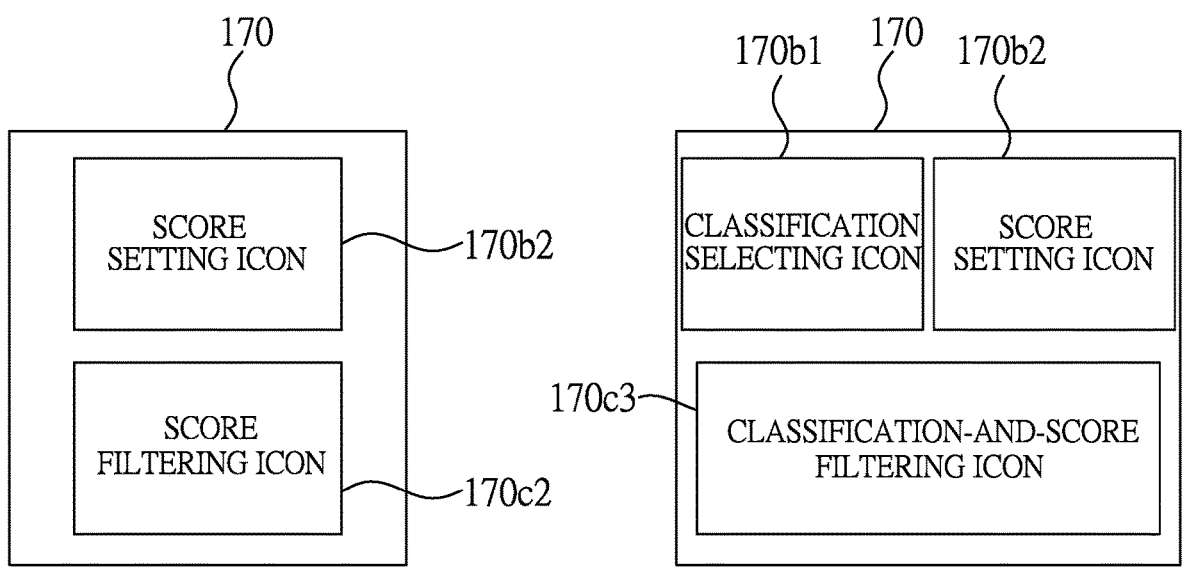
FIG. 4a illustrates another operational interface of the system shown in FIG. 2.
FIG. 4b illustrates another operational interface of the system shown in FIG. 2.
Figure 5:
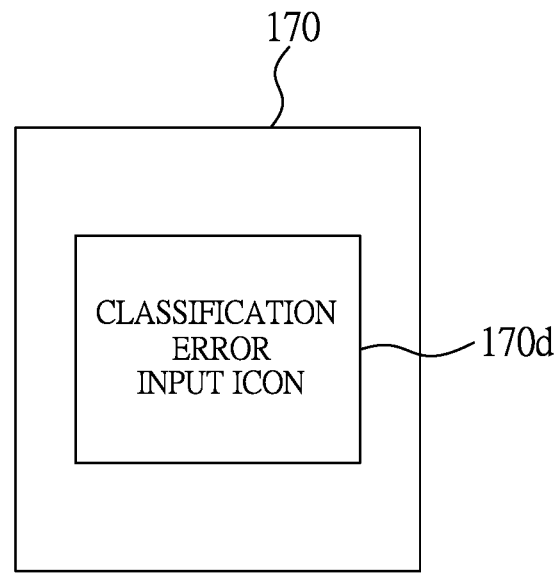
FIG. 5 illustrates another operational interface of the system shown in FIG. 2.
Figure 6:
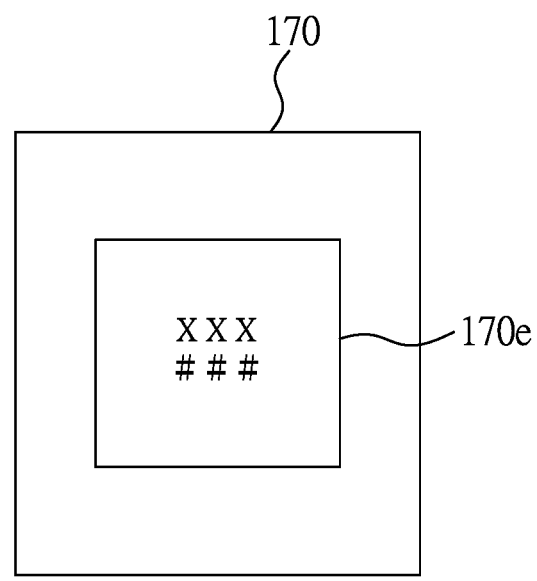
FIG. 6 illustrates another operational interface of the system shown in FIG. 2.
Figure 7:
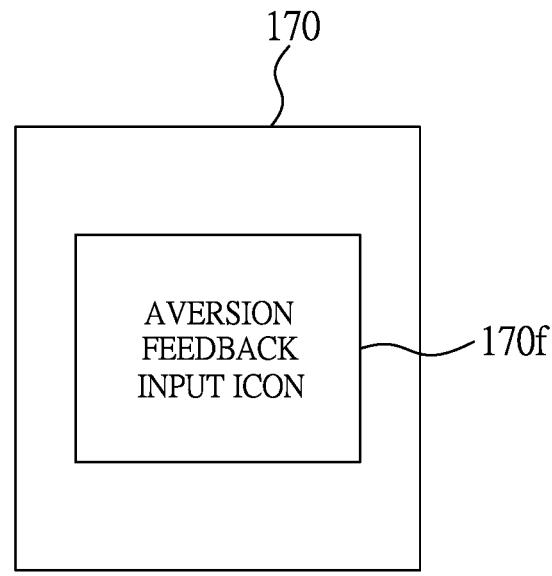
FIG. 7 illustrates another operational interface of the system shown in FIG. 2.
Figure 8:
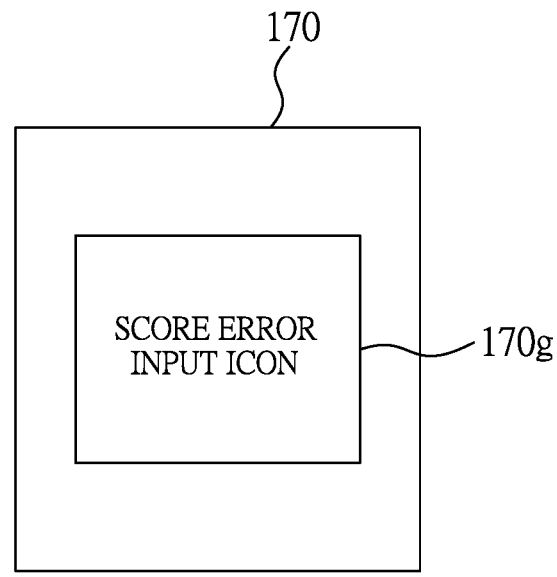
FIG. 8 illustrates still another operational interface of the system shown in FIG. 2.

Please refer to FIGS. 1 to 8, in which FIG. 1 illustrates a flowchart of an embodiment of the intelligent video editing method of the present invention, the method being implemented by an information processing device; FIG. 2 illustrates a block diagram of a system applying the method of FIG. 1; FIG. 3 illustrates an operational interface of the system shown in FIG. 2; FIG. 4a illustrates another operational interface of the system shown in FIG. 2; FIG. 4b illustrates another operational interface of the system shown in FIG. 2; FIG. 5 illustrates another operational interface of the system shown in FIG. 2; FIG. 6 illustrates another operational interface of the system shown in FIG. 2; FIG. 7 illustrates another operational interface of the system shown in FIG. 2; and FIG. 8 illustrates still another operational interface of the system shown in FIG. 2.

As shown in FIG. 1, the method includes the following steps: receiving and decoding an image data stream from a source storage device to generate an image sequence consisting of frames (step a); performing image extraction operations on the image sequence at intervals of a predetermined time to obtain a plurality of image shots, where each of the image shots has n aforementioned frames, and n is an integer greater than or equal to 1 (step b); selecting an i-th one of the n aforementioned frames in each of the image shots as a candidate frame, i being an integer greater than or equal to 1 and less than or equal to n, and performing a comparison operation on any two consecutive aforementioned candidate frames to derive a group of aforementioned candidate frames belonging to a same scene, and selecting one aforementioned candidate frame from the group as a target frame (step c); and using a first neural network to perform a classification evaluation operation on the target frames to attribute each of the target frames to one of a plurality of predetermined classifications; or using a second neural network to perform a score evaluation operation on the target frames to give each of the target frames a score, the score being a real number; or using a first neural network to perform a classification evaluation operation on the target frames to attribute each of the target frames to one of a plurality of predetermined classifications, and using a second neural network to perform a score evaluation operation on the target frames to give each of the target frames a score, the score being a real number; where a plurality of weighting coefficients in the first neural network are obtained by using plural data sets of (input data, output data) to perform a training procedure on the first neural network, the input data being provided by a plurality of the frames prepared in advance, and the output data being provided by a plurality of predetermined classifications, and a plurality of weighting coefficients in the second neural network are obtained by using plural data sets of (input data, output data) to perform a training procedure on the second neural network, the input data being provided by a plurality of the frames prepared in advance, and the output data being provided by a plurality of predetermined real numbers (step d).

In step a, the source storage device can be a cloud storage device or a local storage device of the information processing device.

In step b, the predetermined time can be adjusted according to the content characteristics of the image sequence. For example, when the content of the image sequence is related to an action movie scene, the predetermined time can be shortened, and when the content of the video sequence is related to a still life scene, the predetermined time can be extended. In addition, an image shot can have one or more aforementioned frames.

In step c, the comparison operation is used to compare a difference value of two moment vectors of any two consecutive aforementioned candidate frames with a threshold, and the two candidate frames will be attributed to an aforementioned same scene when the difference value is less than the threshold, where the difference value can be a root mean square error or a cosine distance, and the moment vector is generated by: dividing an aforementioned candidate frame into n sub-regions in terms of a color space, n being a positive integer; performing m different moment estimation operations on each of the sub-regions to generate m different orders of moment values, m being a positive integer, where the m moment values are m options selected from a group consisting of first-order moment value (average value), second-order moment value (variance value), third-order moment value (skewness value), fourth-order moment value (kurtosis value), . . . and k-th order moment value, k being a positive integer greater than or equal to m; and using a total of n*m moment values generated from the n sub-regions to form the moment vector. Accordingly, the present invention can reduce the load of data processing by selecting one of multiple aforementioned frames belonging to a same scene for processing.

In step d, a plurality of weighting coefficients in the first neural network are obtained by using plural data sets of (input data, output data) to perform a training procedure on the first neural network, the input data being provided by a plurality of the frames prepared in advance, and the output data being provided by a plurality of predetermined classifications, and a plurality of weighting coefficients in the second neural network are obtained by using plural data sets of (input data, output data) to perform a training procedure on the second neural network, the input data being provided by a plurality of the frames prepared in advance, and the output data being provided by a plurality of predetermined real numbers.

In addition, when the intelligent video editing method of the present invention utilizes the first neural network to perform the classification evaluation operation, the information processing device can further provide a user interface for a user to select an aforementioned predetermined classification to get at least one required aforementioned target frame from a memory unit.

In addition, when the intelligent video editing method of the present invention uses the second neural network to perform the score evaluation operation, at least one aforementioned score generated thereof can be stored in a memory unit; or at least one of the at least one aforementioned score generated thereof that is higher than a predetermined score can be stored in a memory unit; or at least one aforementioned score generated thereof can undergo a sorting process and then be stored in a memory unit. In addition, when the intelligent video editing method of the present invention uses the second neural network to perform the score evaluation operation, the information processing device can further provide a user interface for a user to set the predetermined score and get at least one aforementioned target frame having an aforementioned score higher than the predetermined score from the memory unit. For example, the user can set the predetermined score to 8, and select at least one aforementioned target frame having an aforementioned score higher than 8 from the memory unit.

In addition, the information processing device can further include a classification error recording module for storing at least one erroneous result of the classification evaluation calculation, which is reported by the user through the user interface, into the memory unit, so as to improve the first neural network.

In addition, the information processing device can further include a preference tracking module for storing the user's selection records of the predetermined classifications into the memory unit.

In addition, the information processing device can further include an aversion tracking module for storing at least one aversion feedback record of one of the predetermined classifications, which is input by the user through the user interface, into the memory unit.

In addition, the information processing device can further include an advertisement providing module for providing the user with at least one advertising message by referencing the records of the user's selections stored in the preference tracking module and/or the records of aversion feedbacks stored in the aversion tracking module.

In addition, the information processing device can further include a filtering module to filter messages for the user by referencing the records of aversion feedbacks stored in the aversion tracking module. For example, the target frames corresponding to the aversion feedback records can be blocked so that the user will not see unwanted images.

In addition, the information processing device can further include a score error recording module for storing at least one erroneous result of the score evaluation operation, which is reported by the user through the user interface, into the memory unit, so as to improve the second neural network.

As shown in FIG. 2, the system of the present invention has an information processing device 100, which can be a desktop computer, a portable computer, a smart phone or a NAS (network attached storage) device, which includes a memory unit 110, a decoding unit 120, an image extraction unit 130, a first neural network 140, a second neural network 150, an editing unit 160 and a user interface 170. The editing unit 160 includes a classification error recording module 161, a preference tracking module 162, an aversion tracking module 163a, a filtering module 163b, an advertisement providing module 164, and a score error recording module 165.

When in operation, the information processing device 100 performs the following steps:

(1) The decoding unit 120 receives and decodes an image data stream DSTREAM from a source storage device to generate an image sequence DVIDEO consisting of a plurality of frames, where the source storage device can be a cloud storage device or a local storage device of the information processing device 100.

(2) The image extraction unit 130 performs image extraction operations on the image sequence DVIDEO at intervals of a predetermined time to obtain a plurality of image shots, where each of the image shots has n aforementioned frames, and n is an integer greater than or equal to 1; selects an i-th one of the n aforementioned frames in each of the image shots as a candidate frame, i being an integer greater than or equal to 1 and less than or equal to n, and performs a comparison operation on any two consecutive aforementioned candidate frames to derive a group of aforementioned candidate frames belonging to a same scene, and select one aforementioned candidate frame from the group as a target frame; where the comparison operation is used to compare a difference value of two moment vectors of any two consecutive aforementioned candidate frames with a threshold, and the two candidate frames will be attributed to an aforementioned same scene when the difference value is less than the threshold, where the difference value can be a root mean square error or a cosine distance, and the moment vector is generated by: dividing an aforementioned candidate frame into n sub-regions in terms of a color space, n being a positive integer; performing m different moment estimation operations on each of the sub-regions to generate m different orders of moment values, m being a positive integer, where the m moment values are m options selected from a group consisting of first-order moment value (average value), second-order moment value (variance value), third-order moment value (skewness value), fourth-order moment value (kurtosis value), . . . and k-th order moment value, k being a positive integer greater than or equal to m; and using a total of n*m moment values generated from the n sub-regions to form the moment vector.

(3) Use the first neural network 140 to perform a classification evaluation operation on the target frames to attribute each of the target frames to one of a plurality of predetermined classifications; or use the second neural network 150 to perform a score evaluation operation on the target frames to give each of the target frames a score, the score being a real number; or use the first neural network 140 to perform a classification evaluation operation on the target frames to attribute each of the target frames to one of a plurality of predetermined classifications, and use the second neural network 150 to perform a score evaluation operation on the target frames to give each of the target frames a score, the score being a real number; where a plurality of weighting coefficients in the first neural network 140 are obtained by using plural data sets of (input data, output data) to perform a training procedure on the first neural network 140, the input data being provided by a plurality of the frames prepared in advance, and the output data being provided by a plurality of predetermined classifications, and a plurality of weighting coefficients in the second neural network 150 are obtained by using plural data sets of (input data, output data) to perform a training procedure on the second neural network 150, the input data being provided by a plurality of the frames prepared in advance, and the output data being provided by a plurality of predetermined real numbers.

In addition, when the first neural network 140 performs the classification evaluation operation, each of the target frames can be stored in the memory unit 110 according to a corresponding one of the predetermined classifications, and the user interface 170 can be used to enable a user to select one of the predetermined classifications to get at least one of the target frames as required from the memory unit 110.

In addition, when the second neural network 150 performs the score evaluation operation, at least one aforementioned score generated thereof can be stored in the memory unit 110; or at least one of the at least one aforementioned score generated thereof that is higher than a predetermined score can be stored in the memory unit 110; or at least one aforementioned score generated thereof can undergo a sorting process and then be stored in the memory unit 110. In addition, when the second neural network 150 performs the score evaluation operation, the user interface 170 can enable a user to set the predetermined score and get at least one aforementioned target frame having an aforementioned score higher than the predetermined score from the memory unit 110. For example, the user can set the predetermined score to 8, and select at least one aforementioned target frame having an aforementioned score higher than 8 from the memory unit 110.

In addition, the classification error recording module 161 is used to store at least one erroneous result of the classification evaluation operation, which is reported by the user through the user interface 170, into the memory unit 110, so as to improve the first neural network 140.

In addition, the preference tracking module 162 is used to store the user's selection records of the predetermined classifications into the memory unit 110.

In addition, the aversion tracking module 163*a* is used to store the aversion feedback records of at least one of the predetermined classifications, which are input by the user through the user interface 170, into the memory unit 110.

In addition, the filtering module 163*b* is used to filter the messages for the user by referencing the aversion feedback records stored in the aversion tracking module 163*a*. For example, the target frames corresponding to the aversion feedback records can be blocked so that the user will not see unwanted images.

In addition, the advertisement providing module 164 is used to provide a user with at least one advertising message by referencing the records of the user's selections stored in the preference tracking module 162 and/or the records of aversion feedbacks stored in the aversion tracking module 163*a*, and the at least one advertising message is received by the information processing device 100 via a network from at least one advertisement providing source.

In addition, the score error recording module 165 is used to store at least one erroneous result of the score evaluation operation, which is reported by the user through the user interface 170, into the memory unit 110, so as to improve the second neural network 150.

Please refer to FIG. 3, which illustrates an operational interface of the system shown in FIG. 2. As shown in FIG. 3, the user interface 170 has a classification selecting icon 170*b*1 for the user to select at least one of the predetermined classifications, and a classification filtering icon 170*c*1 to display at least one aforementioned target frame corresponding to the predetermined classification selected in the classification selecting icon 170*b*1. For example, if the user selects an animal classification in the classification selecting icon 170*b*1, the classification filtering icon 170*c*1 will display at least one target frame corresponding to the animal classification.

Please refer to FIG. 4*a*, which illustrates another operational interface of the system shown in FIG. 2. As shown in FIG. 4*a*, the user interface 170 has a score setting icon 170*b*2 for the user to set the predetermined score, and a score filtering icon 170*c*2 to display at least one aforementioned target frame having a score higher than the predetermined score. For example, the user can set the predetermined score to 8, and the score filtering icon 170*c*2 will read and display at least one aforementioned target frame having a score higher than 8 from the memory unit 110.

Please refer to FIG. 4*b*, which illustrates another operational interface of the system shown in FIG. 2. As shown in FIG. 4*b*, the user interface 170 has a classification selecting icon 170*b*1 for the user to select at least one of the predetermined classifications, a score setting icon 170*b*2 for the user to set the predetermined score, and a classification-and-score filtering icon 170*c*3 to display at least one aforementioned target frame that belongs to the predetermined classification and meets a restriction condition of the predetermined score, for example, to display at least one aforementioned target frame having a score higher than 8 in the animal classification.

Please refer to FIG. 5, which illustrates another operational interface of the system shown in FIG. 2. As shown in FIG. 5, the user interface 170 has a classification error input icon 170*d* for the user to input at least one erroneous result of the classification evaluation operation for the information processing device 100 to improve the first neural network 140.

Please refer to FIG. 6, which illustrates another operational interface of the system shown in FIG. 2. As shown in FIG. 6, the user interface 170 has an advertisement message display area 170*e* for displaying at least one advertisement message provided by the advertisement providing module 164.

Please refer to FIG. 7, which illustrates another operational interface of the system shown in FIG. 2. As shown in FIG. 7, the user interface 170 has an aversion feedback input icon 170*f* for the user to mark at least one of the predetermined classifications as dislike.

Please refer to FIG. 8, which illustrates still another operational interface of the system shown in FIG. 2. As shown in FIG. 8, the user interface 170 has a score error input icon 170*g* for the user to input at least one erroneous result of the score evaluation operation for the information processing device 100 to improve the second neural network 150.

Thanks to the proposals disclosed above, the present invention possesses the following advantages:

(1) The intelligent video editing method of the present invention can reduce the amount of data to be processed by performing image extraction operations on an image sequence at intervals of a predetermined time.

(2) The intelligent video editing method of the present invention can derive a group of frames belonging to a same scene by performing a comparison operation on any two consecutive captured frames, and select one from the group as a target frame to further reduce the amount of data to be processed.

(3) The intelligent video editing method of the present invention can use at least one neural network to perform at least one evaluation operation on the target frames to classify and/or rate each of the target frames, can sort the target frames according to ascending or descending order of their respective scores, or select one or more of the target frames that have scores higher than a score threshold, and can store the target frames either sorted or unsorted.

(4) The intelligent video editing method of the present invention can utilize a user interface to enable a user to select a classification or a score threshold so that the user can get the required target frames from a memory unit.

(5) The intelligent video editing method of the present invention can use a user interface to enable users to report an erroneous classification or scoring result generated by the neural network to improve the neural network.

(6) The intelligent video editing method of the present invention can store selection records of a user by utilizing a preference tracking module and/or an aversion tracking module.

(7) The intelligent video editing method of the present invention can use an advertisement providing module to provide a user with at least one advertising message by referencing the selection records stored in the preference tracking module and/or the aversion tracking module.

(8) The intelligent video editing method of the present invention can use a filtering module to filter the messages for a user by referencing the selection records stored in the aversion tracking module, so that the user will not see unwanted images.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. An intelligent video editing method implemented by an information processing device, including:
   receiving and decoding an image data stream from a source storage device to generate an image sequence consisting of frames;
   performing image extraction operations on the image sequence at intervals of a predetermined time to obtain a plurality of image shots, where each of the image shots has n said frames, and n is an integer greater than or equal to 1;
   selecting an i-th one of the n aforementioned frames in each of the image shots as a candidate frame, i being an integer greater than or equal to 1 and less than or equal to n, and performing a comparison operation on any two consecutive said candidate frames to derive a group of said candidate frames belonging to a same scene, and selecting one said candidate frame from the group as a target frame, wherein the comparison operation is used to compare a difference value of two moment vectors of any two consecutive said candidate frames with a threshold, and the two candidate frames will be attributed to said same scene when the difference value is less than the threshold, wherein the difference value can be a root mean square error or a cosine distance; and
   using a first neural network to perform a classification evaluation operation on the target frames to attribute each of the target frames to one of a plurality of predetermined classifications; or using a second neural network to perform a score evaluation operation on the target frames to give each of the target frames a score, the score being a real number; or using a first neural network to perform a classification evaluation operation on the target frames to attribute each of the target frames to one of a plurality of predetermined classifications, and using a second neural network to perform a score evaluation operation on the target frames to give each of the target frames a score, the score being a real number; where a plurality of weighting coefficients in the first neural network are obtained by using plural data sets of (input data, output data) to perform a training procedure on the first neural network, the input data being provided by a plurality of the frames prepared in advance, and the output data being provided by a plurality of predetermined classifications, and a plurality of weighting coefficients in the second neural network are obtained by using plural data sets of (input data, output data) to perform a training procedure on the second neural network, the input data being provided by a plurality of the frames prepared in advance, and the output data being provided by a plurality of predetermined real numbers.

2. The intelligent video editing method as disclosed in claim 1, further including: storing at least one said score, which is generated after using the second neural network to perform the score evaluation operation, into a memory unit.

3. The intelligent video editing method as disclosed in claim 2, wherein when the intelligent video editing method utilizes the second neural network to perform the score evaluation operation, the information processing device further provides a user interface for the user to set the predetermined score and derive at least one said target frame having the score higher than the predetermined score from the memory unit.

4. The intelligent video editing method as disclosed in claim 3, wherein the information processing device further includes a score error recording module for storing at least one erroneous result of the score evaluation operation, which is reported by the user through the user interface, into the memory unit, so as to be used to improve the second neural network.

5. The intelligent video editing method as disclosed in claim 1, further including: storing at least one said score, which is generated after using the second neural network to perform the score evaluation operation and is higher than a predetermined score, into a memory unit.

6. The intelligent video editing method as disclosed in claim 1, further including: sorting and storing at least one said score, which is generated after using the second neural network to perform the score evaluation operation, into a memory unit.

7. The intelligent video editing method as disclosed in claim 1, wherein the source storage device is a cloud storage device or a local storage device of the information processing device.

8. The intelligent video editing method as disclosed in claim 1, wherein when the intelligent video editing method utilizes the first neural network to perform the classification evaluation operation, the information processing device further provides a user interface for a user to select an said predetermined classification and/or an said predetermined score to get at least one desired said target frame from a memory unit.

9. The intelligent video editing method as disclosed in claim 8, wherein the information processing device further includes a classification error recording module for storing at least one erroneous result of the classification evaluation calculation, which is reported by a user through the user interface, into the memory unit, so as to be used to improve the first neural network.

10. The intelligent video editing method as disclosed in claim 8, wherein the information processing device further includes a preference tracking module for storing records of the user's selections of the predetermined classifications into the memory unit.

11. The intelligent video editing method as disclosed in claim 10, wherein the information processing device further includes an aversion tracking module for storing records of aversion feedbacks of at least one of the predetermined classifications, which are reported by the user through the user interface, into the memory unit.

12. The intelligent video editing method as disclosed in claim 11, wherein the information processing device further includes an advertisement providing module for providing the user with at least one advertising message by referencing the records of the user's selections stored in the preference tracking module and/or the records of aversion feedbacks stored in the aversion tracking module.

13. The intelligent video editing method as disclosed in claim 11, wherein the information processing device further includes a filtering module to filter messages for the user by referencing the records of aversion feedbacks stored in the aversion tracking module.

14. An intelligent video editing system, which has the information processing device as disclosed in claim 1 to implement the intelligent video editing method.

15. The intelligent video editing system as disclosed in claim 14, wherein the information processing device is selected from a group consisting of a desktop computer, a portable computer, a smart phone, and a network attached storage device.

* * * * *